US009759462B2

(12) United States Patent
Zou et al.

(10) Patent No.: US 9,759,462 B2
(45) Date of Patent: Sep. 12, 2017

(54) HIGH EFFICIENCY EJECTOR CYCLE

(75) Inventors: Jiang Zou, Zhejiang (CN); Hongsheng Liu, Shanghai (CN); Parmesh Verma, Manchester, CT (US); Thomas D. Radcliff, Vernon, CT (US); Jinliang Wang, Ellington, CT (US)

(73) Assignee: Carrier Corporation, Jupiter, FL (US)

( * ) Notice: Subject to any disclaimer, the term of this patent is extended or adjusted under 35 U.S.C. 154(b) by 987 days.

(21) Appl. No.: 13/703,490

(22) PCT Filed: Jul. 20, 2011

(86) PCT No.: PCT/US2011/044632
§ 371 (c)(1),
(2), (4) Date: Dec. 11, 2012

(87) PCT Pub. No.: WO2012/012501
PCT Pub. Date: Jan. 26, 2012

(65) Prior Publication Data
US 2013/0111935 A1   May 9, 2013

Related U.S. Application Data

(60) Provisional application No. 61/367,102, filed on Jul. 23, 2010.

(51) Int. Cl.
*F25B 41/00* (2006.01)
*F25B 41/06* (2006.01)
(Continued)

(52) U.S. Cl.
CPC ............... *F25B 41/00* (2013.01); *F25B 5/02* (2013.01); *F25B 6/04* (2013.01); *F25B 9/008* (2013.01);
(Continued)

(58) Field of Classification Search
CPC ...... F25B 1/08; F25B 9/08; F25B 9/10; F25B 31/008; F25B 2341/0015; F25B 2400/13
(Continued)

(56) References Cited

U.S. PATENT DOCUMENTS 1,836,318 A    12/1931  Gay
3,199,310 A *  8/1965  Schiichtig ..................... 62/500
(Continued)

FOREIGN PATENT DOCUMENTS

CN        1854647 A       11/2006
CN      102128508 A  *    7/2011 ............... F25B 1/00
(Continued)

OTHER PUBLICATIONS

Office Action for U.S. Appl. No. 13/522,121, dated Apr. 10, 2014.
(Continued)

*Primary Examiner* — Ljiljana Ciric
*Assistant Examiner* — Kirstin Oswald
(74) *Attorney, Agent, or Firm* — Bachman & LaPointe, P.C.

(57) ABSTRACT

A system has a compressor, a heat rejection heat exchanger, first and second ejectors, first and second heat absorption heat exchangers, and a separator. The ejectors each have a primary inlet coupled to the heat rejection exchanger to receive refrigerant. A second heat absorption heat exchanger is coupled to the outlet of the second ejector to receive refrigerant. The separator has an inlet coupled to the outlet of the first ejector to receive refrigerant from the first ejector. The separator has a gas outlet coupled to the secondary inlet of the second ejector to deliver refrigerant to the second ejector. The separator has a liquid outlet coupled to the secondary inlet of the first ejector via the first heat absorption heat exchanger to deliver refrigerant to the first ejector.

24 Claims, 8 Drawing Sheets

(51) Int. Cl.
*F25B 9/06* (2006.01)
*F25B 40/00* (2006.01)
*F25B 40/02* (2006.01)
*F25B 5/02* (2006.01)
*F25B 6/04* (2006.01)
*F25B 9/00* (2006.01)

(52) U.S. Cl.
CPC ............... *F25B 9/06* (2013.01); *F25B 40/00* (2013.01); *F25B 40/02* (2013.01); *F25B 41/062* (2013.01); *F25B 2341/0011* (2013.01); *F25B 2341/0015* (2013.01); *F25B 2400/14* (2013.01)

(58) Field of Classification Search
USPC ................... 62/116, 191, 512, 500, 505, 524
See application file for complete search history.

(56) References Cited

U.S. PATENT DOCUMENTS

| | | | |
|---|---|---|---|
| 3,277,660 A | | 10/1966 | Kemper et al. |
| 3,360,958 A | * | 1/1968 | Miner ............................ 62/470 |
| 3,447,339 A | * | 6/1969 | Rietdijk .................... F25B 1/10 62/500 |
| 3,778,969 A | * | 12/1973 | Sudduth ................ B01D 53/00 261/116 |
| 3,854,301 A | * | 12/1974 | Cytryn .................... F25B 15/00 203/DIG. 17 |
| 4,124,496 A | * | 11/1978 | Cummings .................. 208/361 |
| 4,186,562 A | * | 2/1980 | Tyree, Jr. ................. F25D 3/10 62/165 |
| 4,242,885 A | | 1/1981 | Quack et al. |
| 4,309,877 A | | 1/1982 | Tawse |
| 4,979,374 A | * | 12/1990 | Kabakov et al. ............. 62/238.2 |
| 5,259,198 A | * | 11/1993 | Viegas ............... B60H 1/00007 62/239 |
| 5,267,443 A | * | 12/1993 | Roehrich ............. B60H 1/3202 62/167 |
| 5,343,711 A | * | 9/1994 | Kornhauser et al. ........... 62/116 |
| 5,531,080 A | | 7/1996 | Hirahara et al. |
| 5,996,360 A | | 12/1999 | Tanaka et al. |
| 6,269,650 B1 | * | 8/2001 | Shaw .................... F24F 11/008 236/44 C |
| 6,302,655 B1 | * | 10/2001 | Popov ............................ 417/77 |
| 6,438,993 B2 | | 8/2002 | Takeuchi et al. |
| 6,477,857 B2 | | 11/2002 | Takeuchi et al. |
| 6,574,987 B2 | | 6/2003 | Takeuchi et al. |
| 6,658,888 B2 | | 12/2003 | Manohar et al. |
| 6,675,609 B2 | * | 1/2004 | Takeuchi .................. F25B 1/08 62/197 |
| 6,698,234 B2 | | 3/2004 | Gopalnarayanan et al. |
| 6,782,713 B2 | | 8/2004 | Takeuchi et al. |
| 6,857,286 B2 | * | 2/2005 | Ohta ...................... B60H 1/323 62/498 |
| 6,880,362 B2 | | 4/2005 | Choi et al. |
| 6,901,763 B2 | | 6/2005 | Memory et al. |
| 7,086,248 B2 | | 8/2006 | Sakai et al. |
| 7,367,202 B2 | * | 5/2008 | Yamada et al. ................. 62/500 |
| 7,690,219 B2 | | 4/2010 | Suzuki et al. |
| 7,757,514 B2 | * | 7/2010 | Oshitani .................... F25B 5/00 62/191 |
| 2002/0124592 A1 | * | 9/2002 | Takeuchi et al. .............. 62/500 |
| 2004/0003608 A1 | * | 1/2004 | Takeuchi et al. .............. 62/170 |
| 2004/0079102 A1 | * | 4/2004 | Umebayashi ...... B60H 1/00921 62/324.1 |
| 2004/0123624 A1 | * | 7/2004 | Ohta et al. ...................... 62/498 |
| 2004/0187519 A1 | * | 9/2004 | Zhu .......................... F25B 9/10 62/613 |
| 2004/0261449 A1 | | 12/2004 | Memory et al. |
| 2005/0268644 A1 | * | 12/2005 | Oshitani ............... B60H 1/323 62/500 |
| 2006/0182680 A1 | * | 8/2006 | Keefer et al. .................. 423/651 |
| 2006/0218964 A1 | * | 10/2006 | Saito et al. ..................... 62/500 |
| 2006/0266072 A1 | * | 11/2006 | Takeuchi et al. .............. 62/500 |
| 2007/0000262 A1 | * | 1/2007 | Ikegami .................. F25B 41/00 62/170 |
| 2007/0028630 A1 | | 2/2007 | Yamada et al. |
| 2007/0028646 A1 | * | 2/2007 | Oshitani ................. F25B 40/00 62/500 |
| 2007/0271942 A1 | * | 11/2007 | Yokoyama et al. ............ 62/278 |
| 2008/0016903 A1 | * | 1/2008 | Artsiely ........................... 62/476 |
| 2008/0041079 A1 | * | 2/2008 | Nishijima et al. .............. 62/191 |
| 2008/0196446 A1 | | 8/2008 | Nakamura et al. |
| 2009/0095003 A1 | * | 4/2009 | Nagano et al. ................. 62/217 |
| 2009/0223245 A1 | | 9/2009 | Heinbokel |
| 2009/0229304 A1 | * | 9/2009 | Ogata ..................... F25B 5/04 62/500 |
| 2010/0162751 A1 | * | 7/2010 | Nishijima ................. F25B 1/10 62/500 |
| 2010/0223938 A1 | * | 9/2010 | Bush et al. ...................... 62/117 |
| 2011/0005268 A1 | * | 1/2011 | Oshitani et al. ................ 62/500 |

FOREIGN PATENT DOCUMENTS

| | | | | |
|---|---|---|---|---|
| JP | 52058147 A | | 5/1977 | |
| JP | 2001221517 A | * | 8/2001 | ............... F25B 1/10 |
| JP | 2003287294 A | | 10/2003 | |
| JP | 2004239506 A | | 8/2004 | |

OTHER PUBLICATIONS

Chinese Office Action for Chinese Patent Application No. 201180036128.8, dated Oct. 24, 2014.
International Search Report and Written Opinion for PCT/US2011/044632, dated Jan. 13, 2012.

* cited by examiner

HIGH EFFICIENCY EJECTOR CYCLE

CROSS-REFERENCE TO RELATED APPLICATION

Benefit is claimed of U.S. patent application Ser. No. 61/367,102, filed Jul. 23, 2010, and entitled "High Efficiency Ejector Cycle", the disclosure of which is incorporated by reference herein in its entirety as if set forth at length.

BACKGROUND

The present disclosure relates to refrigeration. More particularly, it relates to ejector refrigeration systems.

Figure 1:
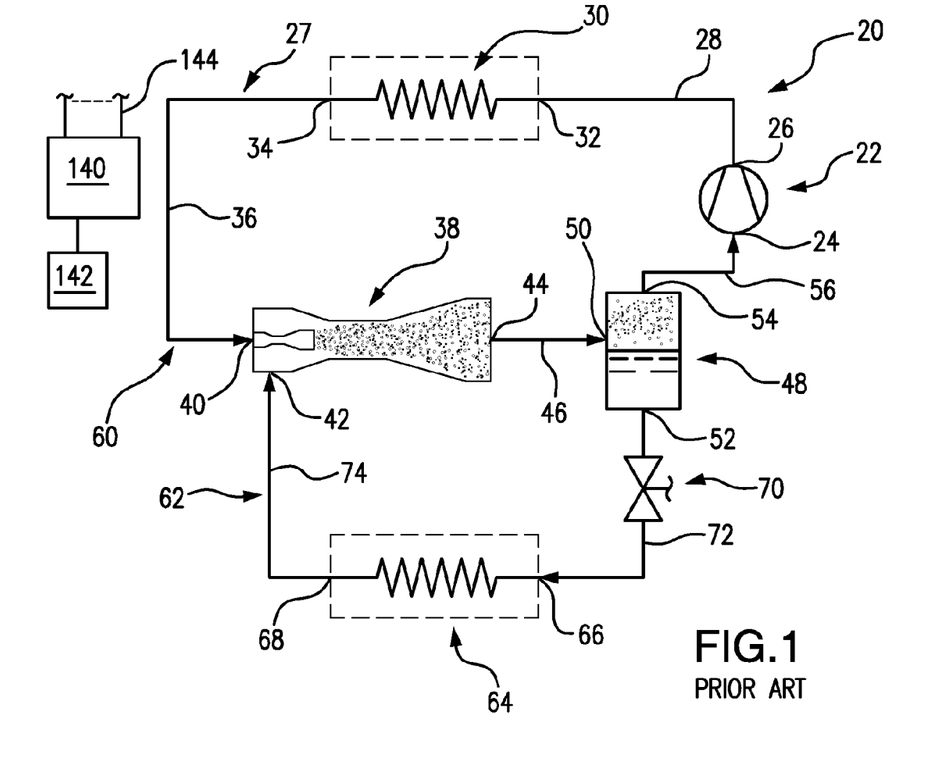
FIG. 1 is a schematic view of a prior art ejector refrigeration system.

Earlier proposals for ejector refrigeration systems are found in U.S. Pat. No. 1,836,318 and U.S. Pat. No. 3,277,660. FIG. 1 shows one basic example of an ejector refrigeration system 20. The system includes a compressor 22 having an inlet (suction port) 24 and an outlet (discharge port) 26. The compressor and other system components are positioned along a refrigerant circuit or flowpath 27 and connected via various conduits (lines). A discharge line 28 extends from the outlet 26 to the inlet 32 of a heat exchanger (a heat rejection heat exchanger in a normal mode of system operation (e.g., a condenser or gas cooler)) 30. A line 36 extends from the outlet 34 of the heat rejection heat exchanger 30 to a primary inlet (liquid or supercritical or two-phase inlet) 40 of an ejector 38. The ejector 38 also has a secondary inlet (saturated or superheated vapor or two-phase inlet) 42 and an outlet 44. A line 46 extends from the ejector outlet 44 to an inlet 50 of a separator 48. The separator has a liquid outlet 52 and a gas outlet 54. A suction line 56 extends from the gas outlet 54 to the compressor suction port 24. The lines 28, 36, 46, 56, and components therebetween define a primary loop 60 of the refrigerant circuit 27. A secondary loop 62 of the refrigerant circuit 27 includes a heat exchanger 64 (in a normal operational mode being a heat absorption heat exchanger (e.g., evaporator)). The evaporator 64 includes an inlet 66 and an outlet 68 along the secondary loop 62 and expansion device 70 is positioned in a line 72 which extends between the separator liquid outlet 52 and the evaporator inlet 66. An ejector secondary inlet line 74 extends from the evaporator outlet 68 to the ejector secondary inlet 42.

In the normal mode of operation, gaseous refrigerant is drawn by the compressor 22 through the suction line 56 and inlet 24 and compressed and discharged from the discharge port 26 into the discharge line 28. In the heat rejection heat exchanger, the refrigerant loses/rejects heat to a heat transfer fluid (e.g., fan-forced air or water or other fluid). Cooled refrigerant exits the heat rejection heat exchanger via the outlet 34 and enters the ejector primary inlet 40 via the line 36.

The exemplary ejector 38 (FIG. 2) is formed as the combination of a motive (primary) nozzle 100 nested within an outer member 102. The primary inlet 40 is the inlet to the motive nozzle 100. The outlet 44 is the outlet of the outer member 102. The primary refrigerant flow 103 enters the inlet 40 and then passes into a convergent section 104 of the motive nozzle 100. It then passes through a throat section 106 and an expansion (divergent) section 108 through an outlet 110 of the motive nozzle 100. The motive nozzle 100 accelerates the flow 103 and decreases the pressure of the flow. The secondary inlet 42 forms an inlet of the outer member 102. The pressure reduction caused to the primary flow by the motive nozzle helps draw the secondary flow 112 into the outer member. The outer member includes a mixer having a convergent section 114 and an elongate throat or mixing section 116. The outer member also has a divergent section or diffuser 118 downstream of the elongate throat or mixing section 116. The motive nozzle outlet 110 is positioned within the convergent section 114. As the flow 103 exits the outlet 110, it begins to mix with the flow 112 with further mixing occurring through the mixing section 116 which provides a mixing zone. In operation, the primary flow 103 may typically be supercritical upon entering the ejector and subcritical upon exiting the motive nozzle. The secondary flow 112 is gaseous (or a mixture of gas with a smaller amount of liquid) upon entering the secondary inlet port 42. The resulting combined flow 120 is a liquid/vapor mixture and decelerates and recovers pressure in the diffuser 118 while remaining a mixture. Upon entering the separator, the flow 120 is separated back into the flows 103 and 112. The flow 103 passes as a gas through the compressor suction line as discussed above. The flow 112 passes as a liquid to the expansion valve 70. The flow 112 may be expanded by the valve 70 (e.g., to a low quality (two-phase with small amount of vapor)) and passed to the evaporator 64. Within the evaporator 64, the refrigerant absorbs heat from a heat transfer fluid (e.g., from a fan-forced air flow or water or other liquid) and is discharged from the outlet 68 to the line 74 as the aforementioned gas.

Use of an ejector serves to recover pressure/work. Work recovered from the expansion process is used to compress the gaseous refrigerant prior to entering the compressor. Accordingly, the pressure ratio of the compressor (and thus the power consumption) may be reduced for a given desired evaporator pressure. The quality of refrigerant entering the evaporator may also be reduced. Thus, the refrigeration effect per unit mass flow may be increased (relative to the non-ejector system). The distribution of fluid entering the evaporator is improved (thereby improving evaporator performance). Because the evaporator does not directly feed the compressor, the evaporator is not required to produce superheated refrigerant outflow. The use of an ejector cycle may thus allow reduction or elimination of the superheated zone of the evaporator. This may allow the evaporator to operate in a two-phase state which provides a higher heat transfer performance (e.g., facilitating reduction in the evaporator size for a given capability).

Figure 2:
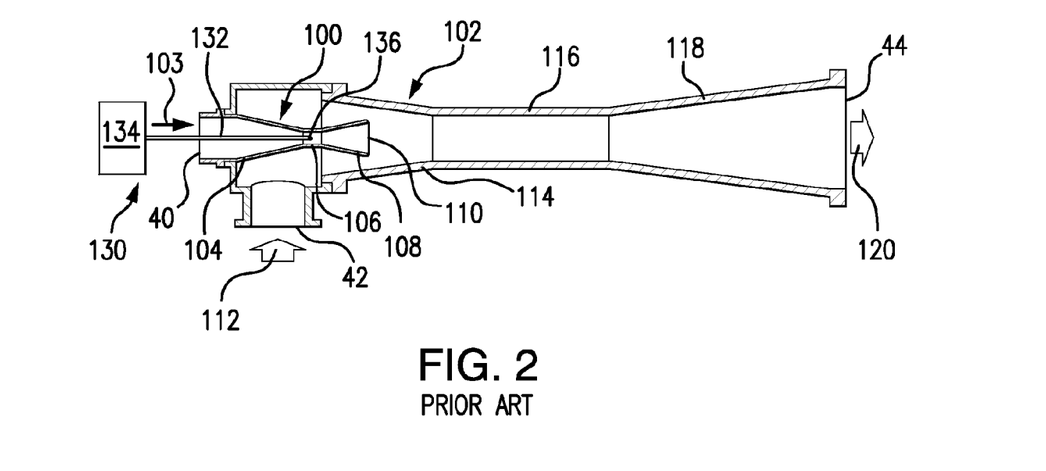
FIG. 2 is an axial sectional view of an ejector.

The exemplary ejector may be a fixed geometry ejector or may be a controllable ejector. FIG. 2 shows controllability provided by a needle valve 130 having a needle 132 and an actuator 134. The actuator 134 shifts a tip portion 136 of the needle into and out of the throat section 106 of the motive nozzle 100 to modulate flow through the motive nozzle and, in turn, the ejector overall. Exemplary actuators 134 are electric (e.g., solenoid or the like). The actuator 134 may be coupled to and controlled by a controller 140 which may receive user inputs from an input device 142 (e.g., switches, keyboard, or the like) and sensors (not shown). The controller 140 may be coupled to the actuator and other controllable system components (e.g., valves, the compressor motor, and the like) via control lines 144 (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

Various modifications of such ejector systems have been proposed. One example in US20070028630 involves placing a second evaporator along the line 46. US20040123624 discloses a system having two ejector/evaporator pairs. Another two-evaporator, single-ejector system is shown in US20080196446. Another method proposed for controlling the ejector is by using hot-gas bypass. In this method a small amount of vapor is bypassed around the gas cooler and injected just upstream of the motive nozzle, or inside the convergent part of the motive nozzle. The bubbles thus introduced into the motive flow decrease the effective throat area and reduce the primary flow. To reduce the flow further more bypass flow is introduced.

SUMMARY

One aspect of the disclosure involves a system having a compressor, a heat rejection heat exchanger, first and second ejectors, first and second heat absorption heat exchangers, and a separator. The heat rejection heat exchanger is coupled to the compressor to receive refrigerant compressed by the compressor. The first ejector has a primary inlet coupled to the heat rejection exchanger to receive refrigerant, a secondary inlet, and an outlet. The first heat absorption heat exchanger is coupled to the first ejector to receive refrigerant. The second ejector has a primary inlet coupled to the heat rejection heat exchanger to receive refrigerant, a secondary inlet, and an outlet. A second heat absorption heat exchanger is coupled to the outlet of the second ejector to receive refrigerant. The separator has an inlet coupled to the outlet of the first ejector to receive refrigerant from the first ejector. The separator has a gas outlet coupled to the secondary inlet of the second ejector to deliver refrigerant to the second ejector. The separator has a liquid outlet coupled to the secondary inlet of the first ejector via the first heat absorption heat exchanger to deliver refrigerant to the first ejector.

In various implementations, the separator may be a gravity separator. The system may have no other separator (i.e., the separator is the only separator). The system may have no other ejector. The second heat absorption heat exchanger may be positioned between the outlet of the second ejector and the compressor. The refrigerant may comprise at least 50% carbon dioxide, by weight. The system may further include a mechanical subcooler positioned between: the heat rejection heat exchanger; and the inlet of the first ejector and the inlet of the second ejector. The system may further include a suction line heat exchanger having a heat rejection heat exchanger and a heat rejection leg and a heat absorption leg. The heat rejection leg may be positioned between: the heat rejection heat exchanger; and the inlet of the first ejector and the inlet of the second ejector. The heat absorption leg may be positioned between the second heat absorption heat exchanger and the compressor. The first and second heat absorption heat exchangers may respectively be in first and second refrigerated spaces.

Other aspects of the disclosure involve methods for operating the system.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 3:
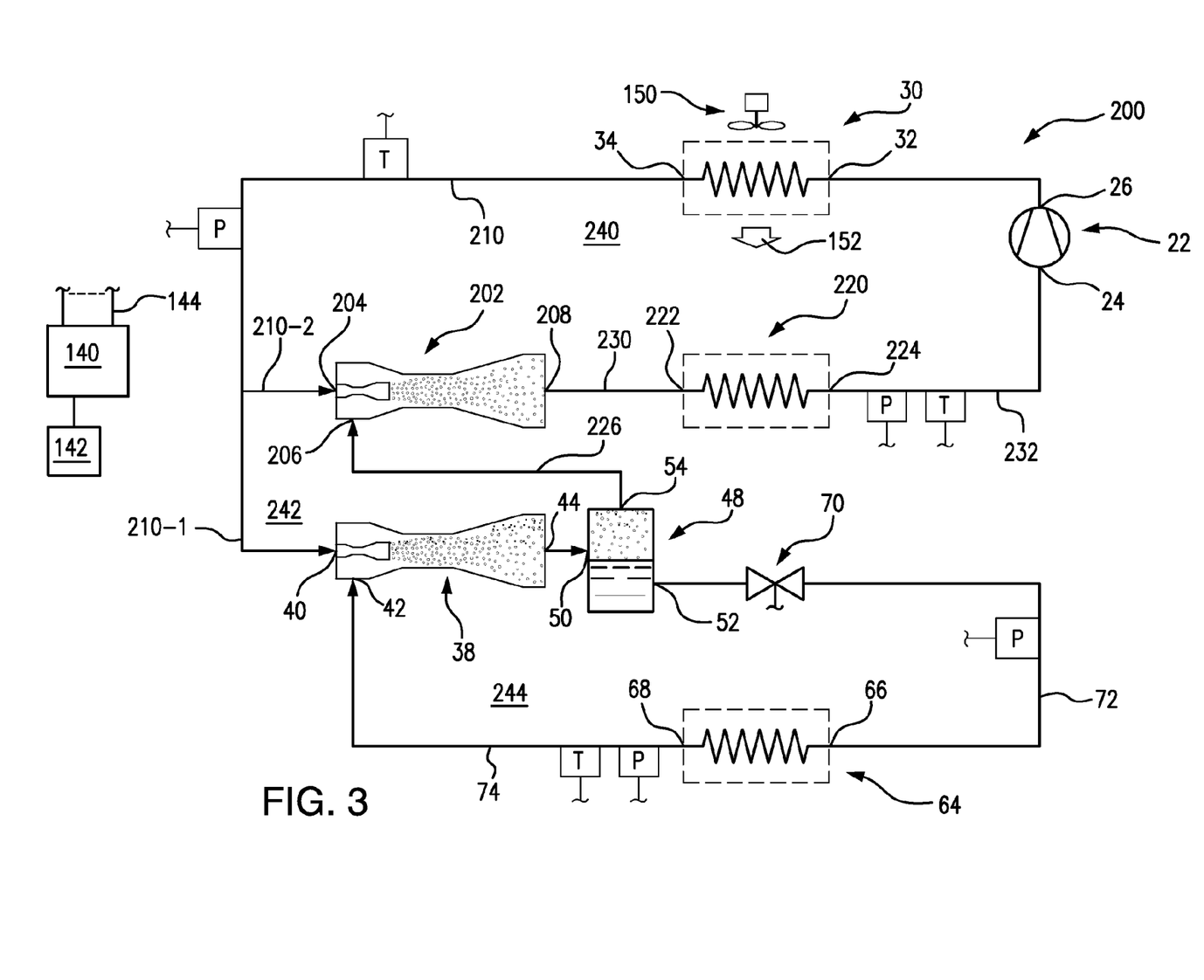
FIG. 3 is a schematic view of a first refrigeration system.

FIG. 3 shows an ejector cycle vapor compression (refrigeration) system 200. The system 200 may be made as a modification of the system 20 or of another system or as an original manufacture/configuration. In the exemplary embodiment, like components which may be preserved from the system 20 are shown with like reference numerals. Operation may be similar to that of the system 20 except as discussed below. The ejector 38 is a first ejector and the system further includes a second ejector 202 having a primary inlet 204, a secondary inlet 206, and an outlet 208 and which may be configured similarly to the first ejector 38. The line 210 exiting the heat rejection heat exchanger outlet and replacing the line 36 splits into branches 210-1 and 210-2 respectively feeding the primary inlets 40 and 204.

Similarly, the evaporator 64 is a first evaporator. The system further includes a second evaporator 220 having an inlet 222 and an outlet 224. Rather than returning directly to the compressor, the refrigerant flow exiting the separator outlet 54 passes through a line 226 to the secondary inlet 206 of the second ejector. Within the second ejector, this second secondary flow combines with the second primary flow through the inlet 204 in a similar fashion as the combining of the secondary and primary flows in the first ejector. The second combined flow exits the outlet 208 to a line 230 extending to the inlet 222 of the second evaporator. Flow exiting the second evaporator passes via the suction line 232 to the compressor inlet port 24.

In the exemplary implementation, a main flow loop/flowpath 240 extends through the compressor, the gas cooler, the primary inlet of the second ejector and the second evaporator. A secondary loop 242 which branches and returns from the main loop includes the branch 210-1 and extends through the first ejector primary inlet, the separator inlet and gas outlet, and the second ejector secondary inlet. A tertiary loop 244 extends from the separator liquid outlet through the expansion device 70, first evaporator 64, and returns to the secondary loop at the first ejector secondary inlet 42.

As is discussed further below, in an exemplary embodiment, the ejectors 38 and 202 are controllable ejectors such as described above. In the exemplary compressor, compressor speed is also controllable as is the valve 70. This provides an exemplary four controlled parameters for the controller 140. The controller 140 receives sensor input from one or more temperature sensors T and pressure sensors P. FIG. 3 also shows a fan 150 (e.g., an electric fan) driving an airflow 152 across the gas cooler 30. As is discussed below, one or more airflows may be similarly driven across the evaporators 64 and 220.

Figure 4:
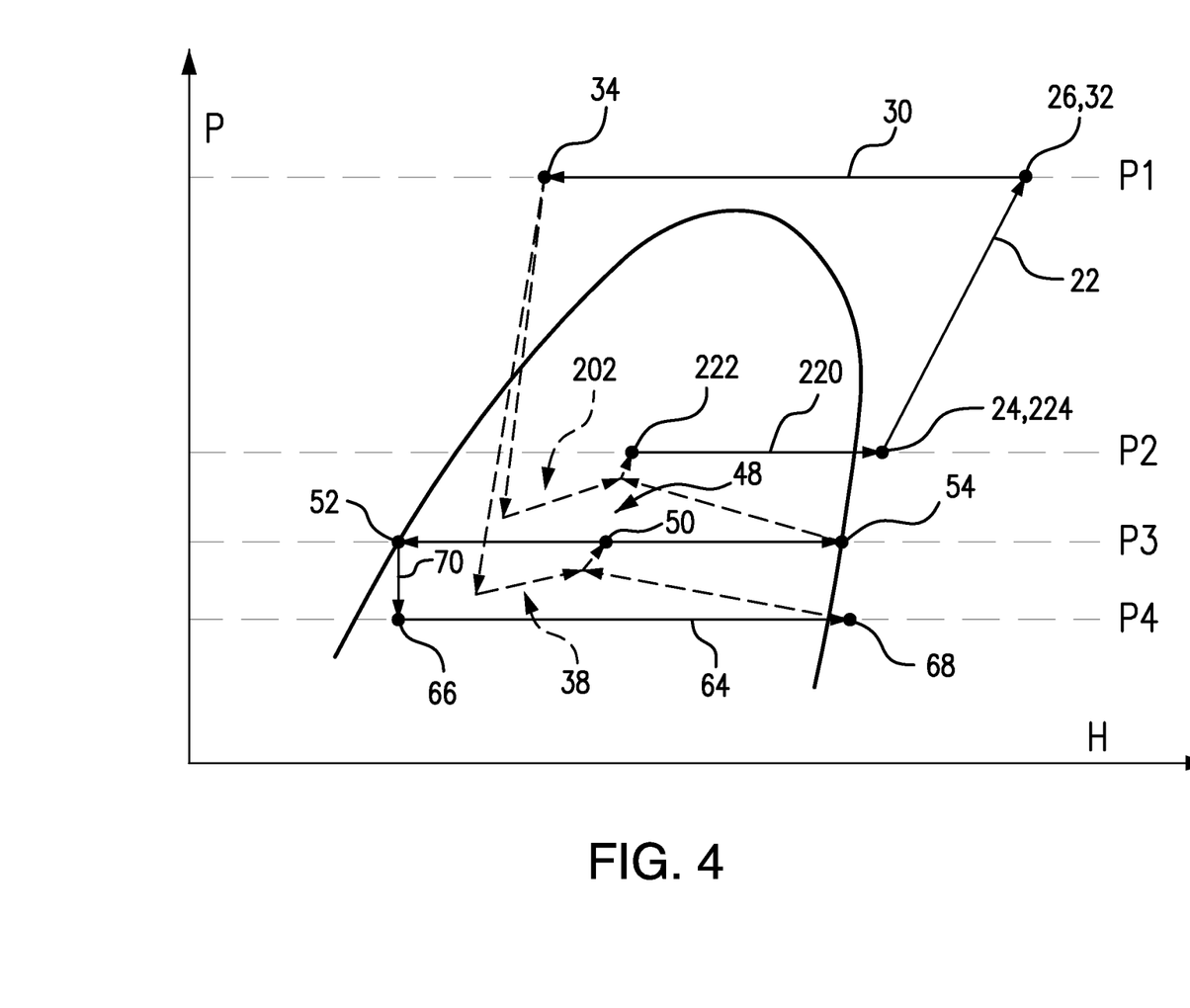
FIG. 4 is a pressure-enthalpy diagram of the system of FIG. 3.

FIG. 4 shows exemplary pressures and enthalpies at various locations in the system. The compressor suction pressure is shown as P2. The compressor compresses the gas to a discharge pressure P1 at increased enthalpy. The gas cooler 30 decreases enthalpy at essentially constant pressure P1 (the "high side" pressure). The second evaporator 220 operates essentially at the suction pressure P2. The first evaporator 64 is operated at yet a lower pressure P4. The separator 48 operates at a pressure P3 between the pressures P2 and P4. The pressure lift ratio is provided by the two ejectors. The first ejector 38 raises the pressure from P4 to P3 while the second ejector 202 raises the pressure from P3 to P2. In the exemplary implementation, the separator 48 outputs pure (or essentially pure (single-phase)) gas and liquid from the respective outlets 54 and 52. In alternative implementations, the gas outlet may discharge a flow containing a minor (e.g., less than 50% by mass, or much less) amount of liquid and/or the liquid outlet may similarly discharge a minor amount of gas.

In an exemplary control method, the controller 140 may vary compressor speed to control overall system capacity. Increasing compressor speed will increase the flow rate to both ejectors (absent additional differential control of the ejectors) and, therefore, to both evaporators.

The valve 70 (e.g., variable expansion valve) may be controlled to, in turn, control the state of the refrigerant exiting the outlet 68 of the first evaporator 64. Control may be performed so as to maintain a target superheat at such outlet 68. The actual superheat may be determined responsive to controller inputs received from the relevant sensors (e.g., responsive to outputs of a temperature sensor and a pressure sensor between the outlet 68 and the first ejector secondary inlet 42). To increase the superheat, the valve 70 is closed; to decrease the superheat, the valve 70 is opened (e.g., in stepwise or continuous fashion). In an alternate embodiment, the pressure can be estimated from a temperature sensor (not shown) along the saturated region of the evaporator. Controlling to provide a proper level of superheat ensures good system performance and efficiency. Too high a superheat value results in a high temperature difference between the refrigerant and air and, thus, results in a lower evaporator pressure P4. If the valve 70 is too open, the superheat may go to zero and the refrigerant leaving the evaporator will be saturated. Too low a superheat indicates that liquid refrigerant is exiting the evaporator. Such liquid refrigerant does not provide cooling and must be re-pumped by the first ejector.

The controllable ejectors may be used to control the high-side pressure P1 and the capacities of each evaporator. To increase the capacity of the first evaporator, the first ejector is opened; to increase the capacity of the second evaporator, the second ejector is opened. High-side pressure P1 may be controlled in order to optimize system efficiency. For example, with a transcritical cycle, such as using carbon dioxide as the refrigerant, raising the high-side pressure decreases the enthalpy at the gas cooler outlet 34 and increases the cooling available for a given compressor mass flow rate. However, increasing the high-side pressure also increases the compressor power consumption. For a given system, there may be an optimum high-side pressure value to maximize system efficiency at a given operating condition. This target pressure may depend on factors such as ambient temperature, compressor speed, and evaporation temperatures. To raise high-side pressure to the target value, the two ejectors are simultaneously closed (e.g., in a continuous or stepwise fashion until the desired pressure is reached). Similarly, to lower high-side pressure, the two ejectors are opened. Differential control of the two ejectors may provide other changes. For example, if the first ejector was closed while the second ejector remains unchanged, the high-side pressure would increase while the capacity of the second evaporator would increase and the capacity of the first evaporator would decrease. The second evaporator 220 is indirectly affected by the operation of valve 70. As the flow rate at the suction port 42 of the first ejector changes, the pressure its outlet port 44 also changes. This pressure is approximately the same as the pressure at the suction port 206 of the second ejector. The controllable motive nozzle of the second ejector 202 may be adjusted to counteract these effects to maintain the desired capacity at the second evaporator. Temperature and pressure sensors at or downstream of the gas cooler outlet 34 and upstream of the ejectors may be used to provide controller input to control the ejectors.

Thus, the exemplary system of FIG. 3 offers four main controllable parameters: compressor speed; the actuators of the two ejectors which define respective motive nozzle throat area; and the openness of the expansion valve or other device 70. In the steady state operation, the control system may iteratively optimize the settings of these parameters to achieve a desired goal (e.g., minimize power consumption) which may be directly or indirectly measured. Alternatively, the relative control may be subject to pre-programmed rules to achieve the desired results in the absence of real time optimization. The same optimization may be used during changing conditions (e.g., changing external temperature of a refrigeration system). Yet other methods may be used in other transition situations (e.g., cool-down situations, defrost situations, and the like).

Other control protocols may be associated with: fixed speed compressors; and/or one or both ejectors being non-controllable; and/or use of a TXV or fixed orifice in place of an EXV as the expansion device 70. Capacity could be controlled by simply modulating the compressor between on and off conditions. Alternatively, high-side pressure could be controlled by use of an EXV between the gas cooler outlet and non-controllable ejectors.

Figure 5:
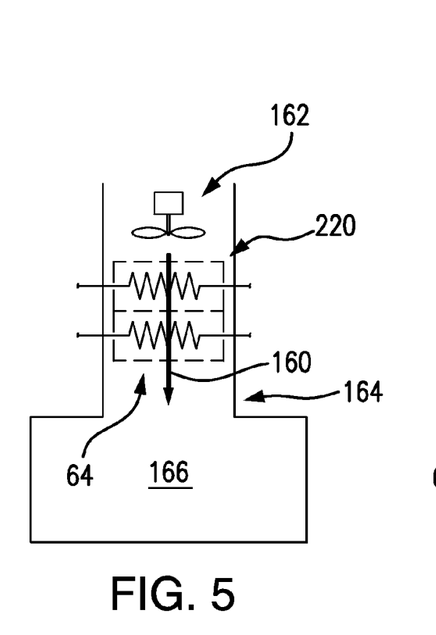
FIG. 5 is a schematic representation of a first evaporator positioning for the system of FIG. 3.

FIG. 5 shows an implementation wherein a single airflow 160 passes over both 5 evaporators 220 and 64 (i.e., refrigerant-air heat exchangers) in series. In this example, the airflow passes directly between the two evaporators (with 220 being upstream). One possible implementation is to form the two evaporators as separate portions of a single physical unit (e.g., a single array of tubes where the different evaporators are formed as different sections of the array by appropriate coupling of tube ends). The airflow 160 may be driven by a fan 162. One example of this is a residential air 10 handling unit 164 for delivering air to a conditioned space 166 (e.g., building/room). In this situation, the second evaporator 220 could remove sensible heat while the first evaporator 64 essentially removes the latent heat. This may be used to provide humidity control by removing water (condensate) from the airflow 160. An appropriate collection and evacuation system (not shown) may be provided to remove the condensate which collects on the heat absorption heat 15 exchangers. The temperatures of the two evaporators may be at least partially independently controlled to provide the desired combination of air temperature and humidity. The second evaporator 220 has an exemplary sensible heat ratio of 75-100%, more narrowly 85-100% and the first evaporator 64 has a lower exemplary sensible heat ratio of 50-65%, more narrowly 40-70%. Exemplary, evaporators are sized so that each does approximately 50% (e.g., 40-60%) 20 of the total cooling load. Specifically, if the two evaporators are formed by the headering of a single tube array, the second heat exchanger 220 may represent a greater number of rows than does the first heat exchanger 64.

Figure 6:
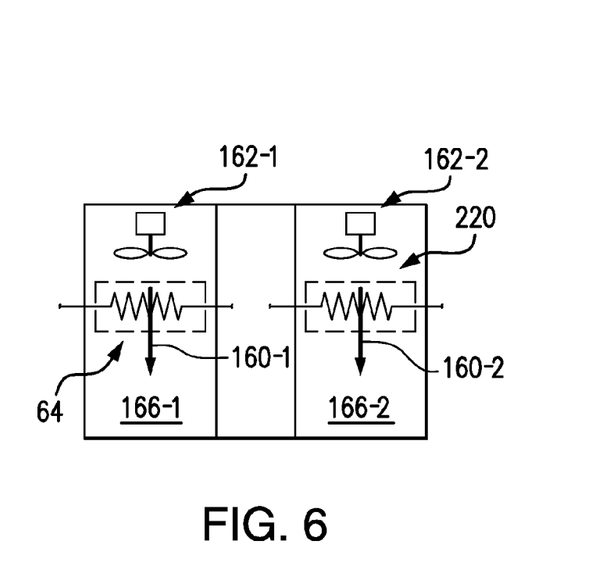
FIG. 6 is a schematic representation of a second evaporator positioning for the system of FIG. 3.

FIG. 6 shows a system wherein separate airflows 160-1 and 160-2 are driven across the evaporators 64 and 220 (i.e., refrigerant-air heat exchangers) respectively via fans 162-1 and 162-2. Such a system may be used to 25 differently condition different spaces. For example, a refrigerated transport or fixed-site refrigeration system, the space 166-1 could be a frozen food storage area; whereas, the space 166-2 could be a storage area for refrigerated perishables maintained at a somewhat higher temperature than the space 166-1. Alternatively, the two spaces could represent different temperature zones of a residential or commercial building.

Figure 7:
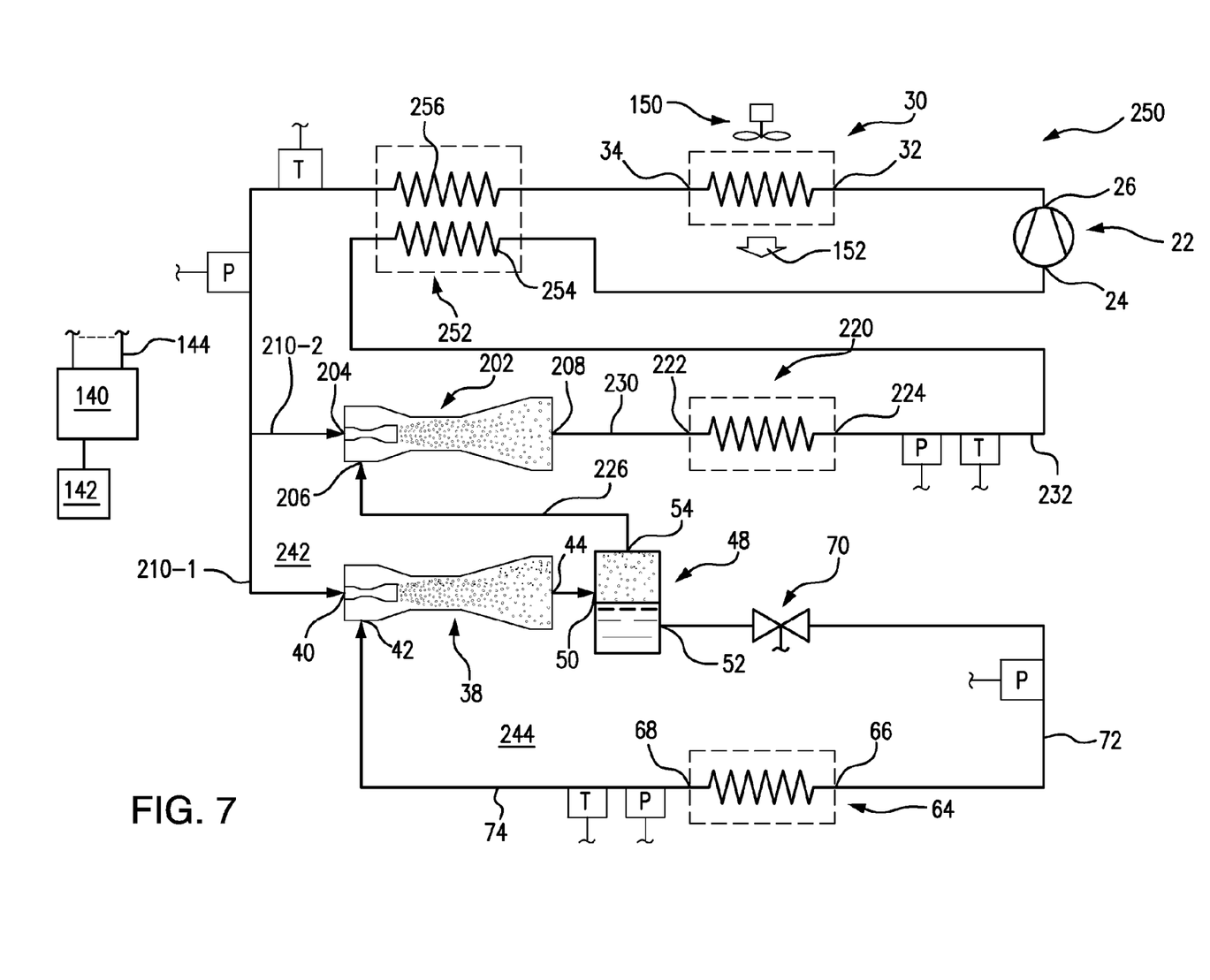
FIG. 7 is a schematic view of a second refrigeration system.

FIG. 7 shows yet a further variation which may otherwise be similar to the system of FIG. 3. The system 250 includes a suction line heat exchanger 252 having a leg 254 (heat absorption leg) along the suction line between the second evaporator and the compressor. The leg 254 is in heat exchange relationship with a leg 256 (heat rejection leg) in the heat rejection heat exchanger outlet line between the heat rejection heat exchanger outlet and the ejector primary inlets.

Figure 8:
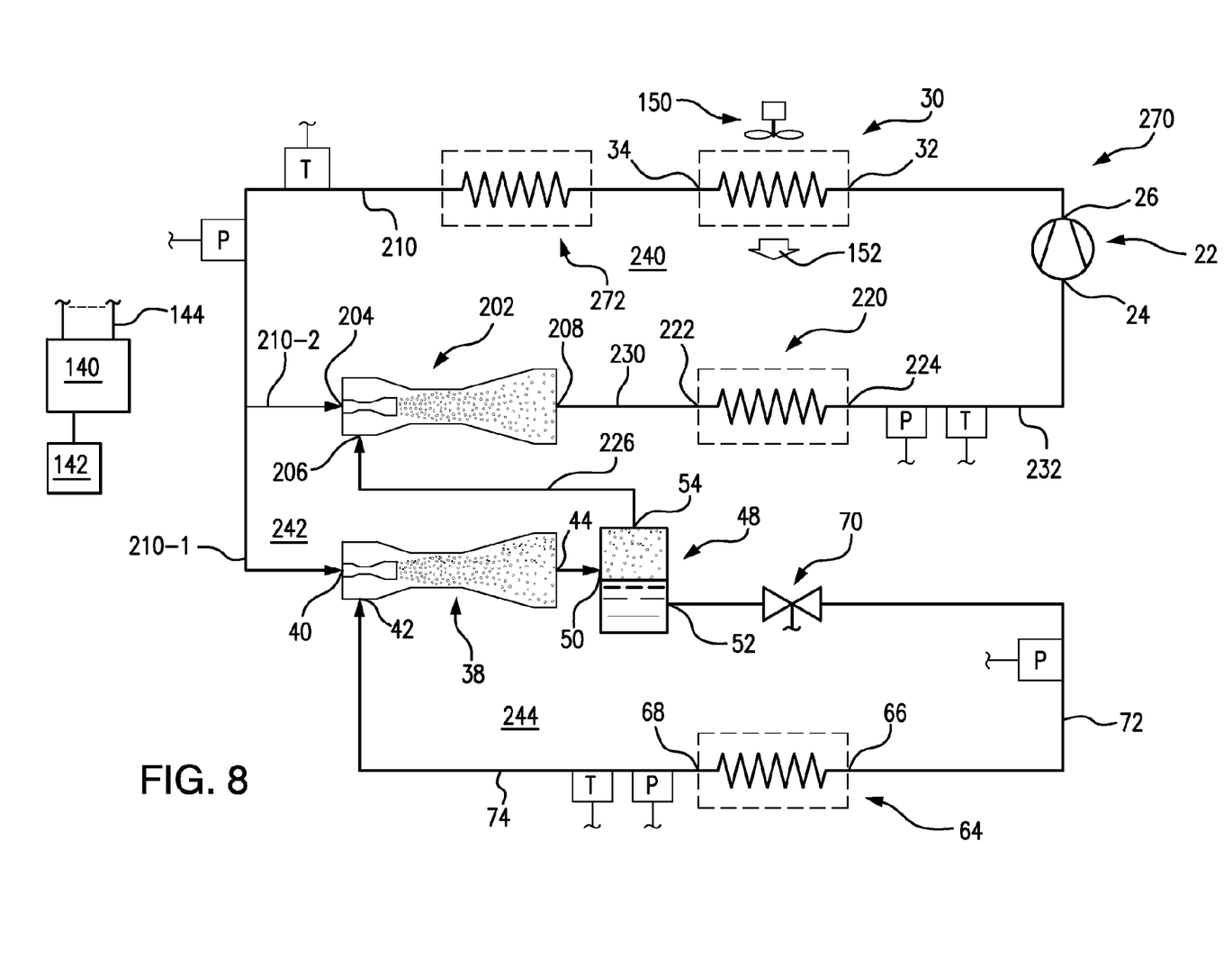
FIG. 8 is a schematic view of a third refrigeration system.

FIG. 8 shows a system 270 which may otherwise be similar to the systems 200 and 250 but which, instead of the suction line heat exchanger, includes a mechanical subcooler 272 in the heat rejection heat exchanger outlet line between the heat rejection heat exchanger outlet and the ejector primary inlets of the ejectors. A mechanical subcooler is another vapor compression system that is used to cool the liquid refrigerant leaving the heat rejection heat exchanger outlet 34 to a temperature below the ambient air temperature. Lowering the refrigerant temperature lowers the enthalpy of the refrigerant entering the ejectors and provides a larger fraction of liquid refrigerant to evaporators. Thus, more evaporator capacity can be realized for the same amount of compressor flow. The penalty is the power required to run the mechanical subcooler, but because this system operates over a small temperature range there is usually a gain in overall system efficiency.

Figure 9:
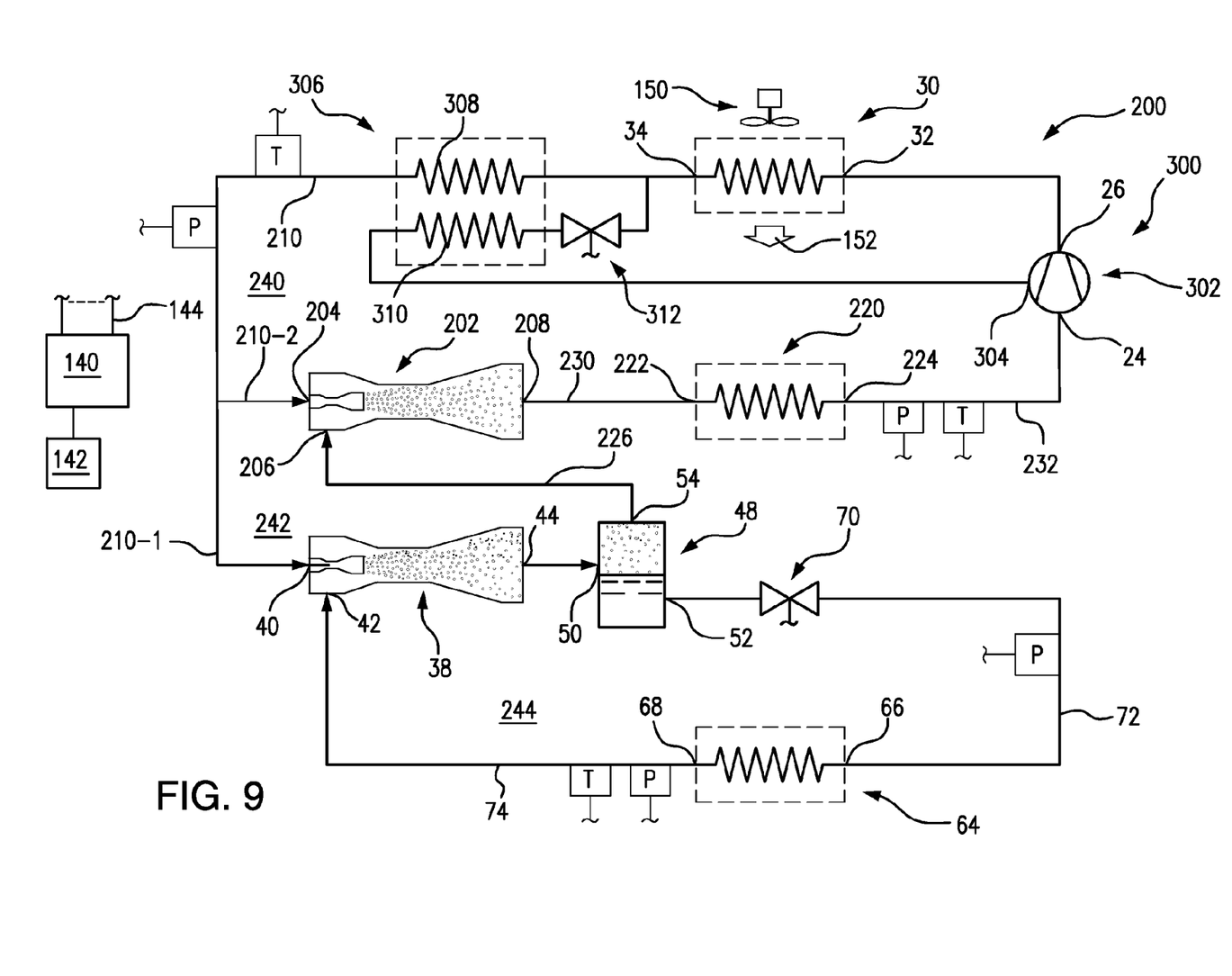
FIG. 9 is a schematic view of a fourth refrigeration system.

FIG. 9 shows a system 300 having an economized compressor cycle. Similar to the mechanical subcooler, the economizer cycle may be used to cool the temperature of the refrigerant leaving the outlet 34 to a value below ambient, and thus provide more cooling capacity for a given amount of compressor suction flow. The exemplary compressor 302 includes an economizer port 304 at an intermediate stage in compression between the suction port 24 and discharge port 26. The economizer heat exchanger 306 has a first leg (heat donor) 308 along the refrigerant flowpath between the gas cooler outlet 34 and the ejector primary inlets. The economizer heat exchanger has a second leg (heat absorption) 310 in heat transfer relation to the first leg 308. The second leg 310 is along an economizer branch of the flowpath which branches off between the gas cooler outlet 34 and first leg 308. Upstream of the second leg 310 along this economizer branch is an expansion device 312 (e.g., a TXV or EXV). The opening of the expansion device 312 permits an economizer flow and provides the second flow with relatively lower refrigerant temperature entering the second leg 310 compared to the temperature of the refrigerant entering the first leg 308. The economizer flow absorbs heat from the main flow, cooling the ejector primary inlet flows below what they otherwise would be. The remaining operation may be similar to that of the previously-described embodiments. Control algorithms may combine traditional or further-modified economizer control algorithms.

Figure 10:
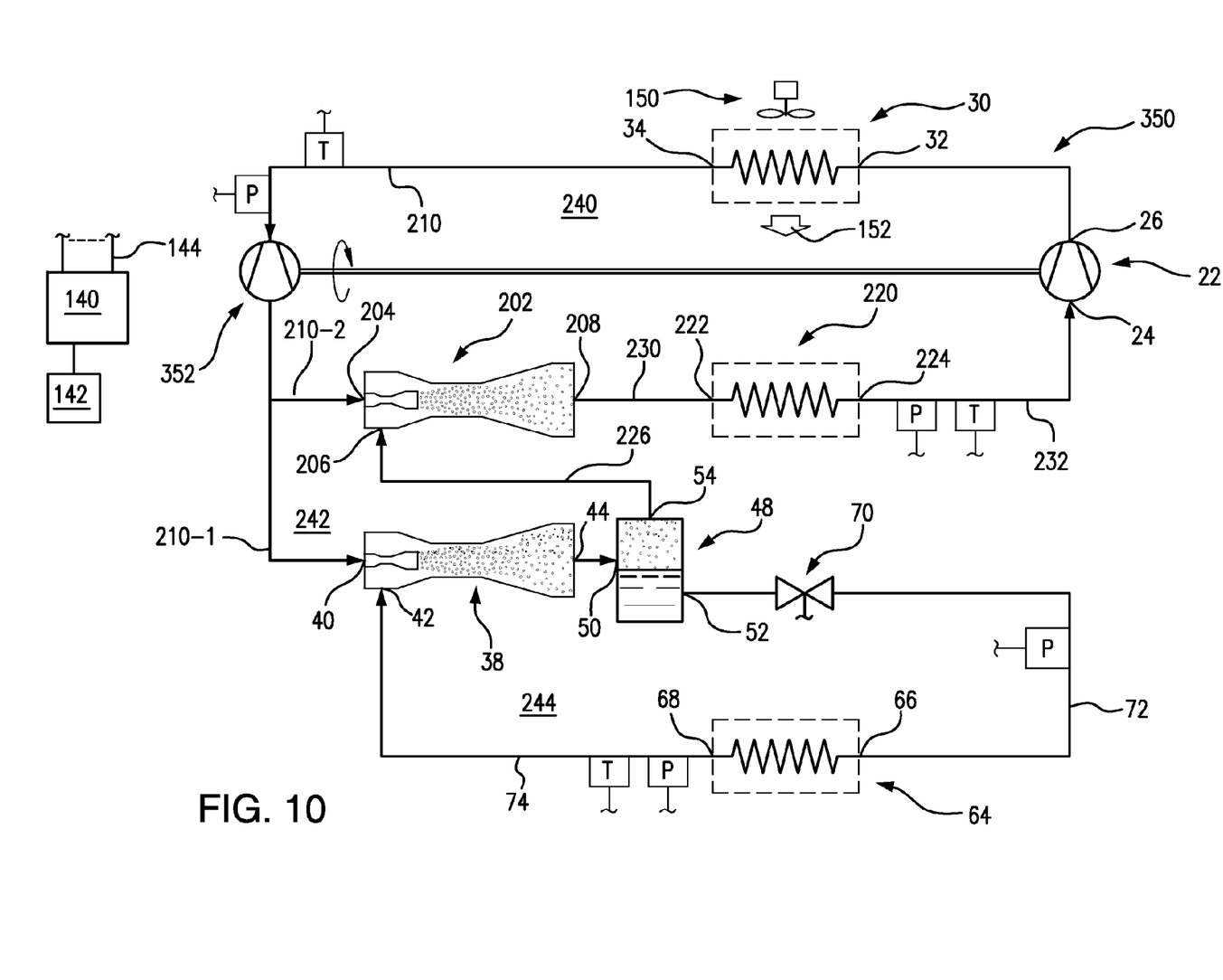
FIG. 10 is a schematic view of a fifth refrigeration system.

FIG. 10 shows a system 350 having an expander 352. The expander is located between the gas cooler outlet 34 and the ejector primary inlets. The expander partially expands the refrigerant to a pressure between P1 and P2 and recovers work from the expansion. The work recovered by the expander is, in the exemplary system, transferred to assist the compressor. Because the expander uses some of the work potential that would otherwise be available for the ejectors, the ejector pressure recovery would be reduced. Thus, such a system may be most suitable when the pressure ratio P1/P2 is large.

The system may be fabricated from conventional components using conventional techniques appropriate for the particular intended uses.

Although an embodiment is described above in detail, such description is not intended for limiting the scope of the present disclosure. It will be understood that various modifications may be made without departing from the spirit and scope of the disclosure. For example, when implemented in the remanufacturing of an existing system or the reengineering of an existing system configuration, details of the existing configuration may influence or dictate details of any particular implementation. Accordingly, other embodiments are within the scope of the following claims.

What is claimed is:

1. A system comprising:
   a compressor;
   a heat rejection heat exchanger coupled to the compressor to receive refrigerant compressed by the compressor;
   a first ejector having:
      a primary inlet coupled to the heat rejection heat exchanger to receive refrigerant;
      a secondary inlet; and
      an outlet;
   a first heat absorption heat exchanger;
   a second ejector having:
      a primary inlet coupled to the heat rejection heat exchanger to receive refrigerant;
      a secondary inlet; and
      an outlet;
   a second heat absorption heat exchanger coupled to the outlet of the second ejector to receive refrigerant; and
   a separator wherein the separator is the only separator in the system, the separator having:
      an inlet coupled to the outlet of the first ejector to receive refrigerant from the first ejector;
      a gas outlet coupled to the secondary inlet of the second ejector to deliver refrigerant to the second ejector; and
      a liquid outlet coupled to the secondary inlet of the first ejector via the first heat absorption heat exchanger to deliver refrigerant to the first ejector.

2. The system of claim 1 further comprising:
   a controllable expansion device between the separator liquid outlet and the first heat absorption heat exchanger.

3. The system of claim 1 wherein:
   the separator is a gravity separator; and
   the system is in an operational condition wherein:
      a single phase gas flow exits the gas outlet; and
      a single phase liquid flow exits the liquid outlet.

4. The system of claim 1 wherein: the first ejector and the second ejector are the only ejectors in the system.

5. The system of claim 1 wherein:
   the second heat absorption heat exchanger is positioned between the outlet of the second ejector and the compressor.

6. The system of claim 1 further comprising a mechanical subcooler positioned between:
a) the heat rejection heat exchanger; and
b) the primary inlet of the first ejector and the primary inlet of the second ejector.

7. The system of claim 1 further comprising a suction line heat exchanger having:
a heat rejection leg positioned between:
a) the heat rejection heat exchanger; and
b) the inlet of the first ejector and the inlet of the second ejector; and
a heat absorption leg positioned between:
c) the second heat absorption heat exchanger; and
b) the compressor.

8. The system of claim 1 in an operational condition wherein:
the first heat absorption heat exchanger is in a first refrigerated space; and
the second heat absorption heat exchanger is in a second refrigerated space.

9. The system of claim 1 wherein:
the first heat absorption heat exchanger and the second heat absorption heat exchanger are positioned so that an airflow is driven by a fan to pass over both the first heat absorption heat exchanger and the second heat absorption heat exchanger to provide humidity control for a conditioned space.

10. The system of claim 1 wherein:
the refrigerant comprises at least 50% carbon dioxide, by weight.

11. A method for operating the system of claim 1 comprising running the compressor in a first mode wherein:
the refrigerant is compressed in the compressor;
refrigerant received from the compressor by the heat rejection heat exchanger rejects heat in the heat rejection heat exchanger to produce initially cooled refrigerant;
the initially cooled refrigerant splits into a first primary flow received by the first ejector primary inlet and a second primary flow received by the second ejector primary inlet;
in the respective first ejector and second ejector, the first primary flow and second primary flow respectively join with a first secondary flow and second secondary flow to respectively form a first outlet flow and a second outlet flow;
the first outlet flow is separated in the separator into a first flow and a second flow, the first flow becoming the first secondary inlet flow and the second flow becoming the second secondary inlet flow;
the first flow passes through the first heat absorption heat exchanger; and
the second outlet flow passes through the second heat absorption heat exchanger and returns to the compressor.

12. The method of claim 11 wherein:
the first flow has a higher proportion of liquid relative to gas than does the second flow; and
the absorption of heat in the first heat absorption heat exchanger causes an increase with the proportion of gas in the first outlet flow to become the first secondary inlet flow.

13. The method of claim 11 wherein:
operation in the first mode is controlled by a controller programmed to control operation of the first ejector, the second ejector, the compressor, and a controllable expansion device between the separator liquid outlet and the first heat absorption heat exchanger;
the first primary inlet flow and second primary inlet flow consist essentially of supercritical or liquid states; and
the first secondary inlet flow and second secondary inlet flow consist essentially of gas.

14. The method of claim 13 wherein:
the first heat absorption heat exchanger and second heat absorption heat exchanger are positioned so that an airflow passes over both in series; and
the controller is programmed to control humidity of the airflow.

15. The method of claim 13 wherein:
the system is in an operational condition wherein:
the second heat absorption heat exchanger has a sensible heat ratio of 85-100%;
and the first heat absorption heat exchanger has a sensible heat ratio of between 40% and 70%.

16. The system of claim 1 wherein:
the first ejector primary inlet and second ejector primary inlet are coupled to the heat rejection heat exchanger in parallel.

17. The system of claim 1 wherein:
the first ejector outlet is coupled directly to the separator inlet; and
the second ejector secondary inlet is coupled directly to the separator gas outlet.

18. The system of claim 1 wherein:
a line exiting the heat rejection heat exchanger splits into a respective first branch and a second branch feeding the first ejector primary inlet and second ejector primary inlet respectively.

19. A system comprising:
a compressor;
a heat rejection heat exchanger coupled to the compressor to receive refrigerant compressed by the compressor;
a first ejector having:
a primary inlet coupled to the heat rejection heat exchanger to receive refrigerant;
a secondary inlet; and
an outlet;
a first heat absorption heat exchanger coupled to the outlet of the first ejector to receive refrigerant;
a second ejector having:
a primary inlet coupled to the heat rejection heat exchanger to receive refrigerant;
a secondary inlet; and
an outlet;
a second heat absorption heat exchanger coupled to the outlet of the second ejector to receive refrigerant; and
means for passing refrigerant from the outlet of the first ejector to the secondary inlet of the second ejector and the refrigerant from the outlet of the second ejector to the inlet of the second heat absorption heat exchanger.

20. The system of claim 19 wherein:
the means for passing refrigerant from the outlet of the first ejector to the secondary inlet of the second ejector and from the outlet of the second ejector to the compressor without bypass back to the second ejector is also means for returning refrigerant from the outlet of the first ejector to the secondary inlet of the first ejector.

21. The system of claim 20 wherein:
the means comprises a separator having a gas outlet coupled to the secondary inlet of the second ejector.

22. The system of claim 19 wherein:
the means comprises a separator having a gas outlet coupled to the secondary inlet of the second ejector.

23. A system comprising:
refrigerant comprising at least 50% carbon dioxide by weight;
a compressor;
a heat rejection heat exchanger coupled to the compressor to receive said refrigerant compressed by the compressor;
a first ejector having:
   a primary inlet coupled to the heat rejection heat exchanger to receive the refrigerant;
   a secondary inlet; and
   an outlet;
a first heat absorption heat exchanger;
a second ejector having:
   a primary inlet coupled to the heat rejection heat exchanger to receive the refrigerant;
   a secondary inlet; and
   an outlet;
a second heat absorption heat exchanger coupled to the outlet of the second ejector to receive the refrigerant; and
a separator having:
   an inlet coupled to the outlet of the first ejector to receive the refrigerant from the first ejector;
   a gas outlet coupled to the secondary inlet of the second ejector to deliver the refrigerant to the second ejector; and
   a liquid outlet coupled to the secondary inlet of the first ejector via the first heat absorption heat exchanger to deliver the refrigerant to the first ejector.

24. A system comprising:
a compressor;
a heat rejection heat exchanger coupled to the compressor to receive refrigerant compressed by the compressor;
a first ejector having:
   a primary inlet coupled to the heat rejection heat exchanger to receive refrigerant;
   a secondary inlet; and
   an outlet;
a first heat absorption heat exchanger being a refrigerant-air heat exchanger;
a second ejector having:
   a primary inlet coupled to the heat rejection heat exchanger to receive refrigerant;
   a secondary inlet; and
   an outlet;
a second heat absorption heat exchanger being a refrigerant-air heat exchanger and coupled to the outlet of the second ejector to receive refrigerant; and
a separator having:
   an inlet coupled to the outlet of the first ejector to receive refrigerant from the first ejector;
   a gas outlet coupled to the secondary inlet of the second ejector to deliver refrigerant to the second ejector; and
   a liquid outlet coupled to the secondary inlet of the first ejector via the first heat absorption heat exchanger to deliver refrigerant to the first ejector.

* * * * *